May 20, 1941.　　　　E. S. TALLMADGE　　　　2,242,731
SPRING STRUCTURE
Filed July 8, 1940　　　　2 Sheets-Sheet 2

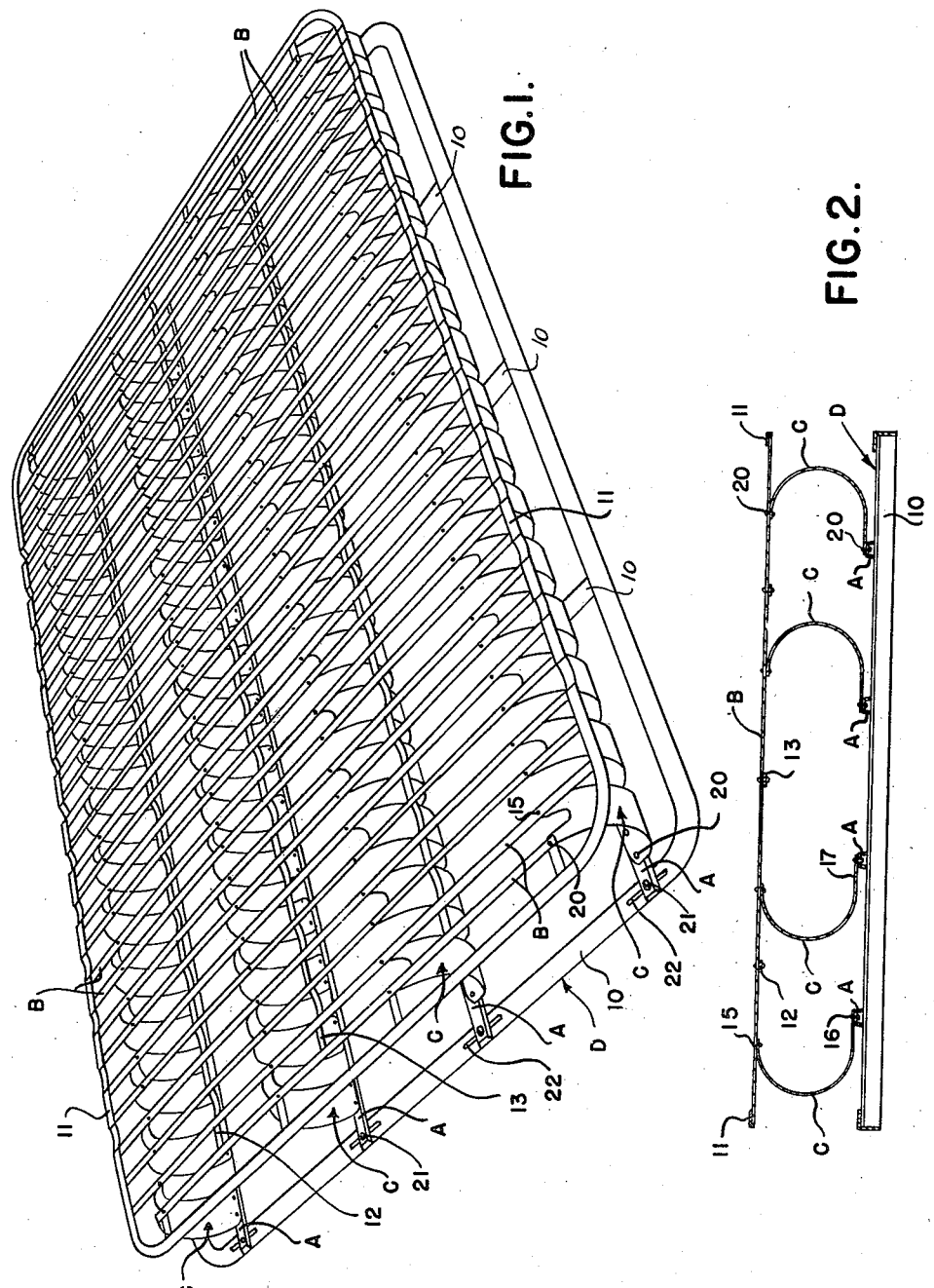

INVENTOR.
EVERETT S. TALLMADGE
BY
ATTORNEYS

Patented May 20, 1941

2,242,731

UNITED STATES PATENT OFFICE 2,242,731

SPRING STRUCTURE

Everett S. Tallmadge, Robbinsdale, Minn., assignor to Edward W. Schlappritzi, Minneapolis, Minn.

Application July 8, 1940, Serial No. 344,443

4 Claims. (Cl. 5—247).

This invention relates generally to spring structures and refers more particularly to those wherein leaf springs of substantially C-shape are employed.

Heretofore when leaf springs of C-shape have been used the points of attachment at the upper and lower ends thereof with the supported and supporting members of the structure have been in a common vertical plane or in a plane normal to the surfaces of such members. Thus, when compression occurs, the upper part of the leaf springs rolls out or flattens into surface-to-surface contact, as from e to f, Figure 8, against the supported surface. While in such surface-to-surface contact, that part e–f of the leaf spring is inactive or inoperative and hence does not contribute to the effectiveness of the spring. By shortening the spring to eliminate the part e–f, waste of material is avoided. The compressive load also causes an objectionable curvature in the conventional C-shaped leaf springs tending to induce excessive stresses. Thus, the desired degree of flexibility is not obtained from such spring structures, rupture or breakage is apt to occur, and the leaves of the springs have to be unduly long.

Thus, one of the essential objects of the present invention is to improve the elasticity and durability of the leaf springs and to conserve material.

Another object is to provide an assembly wherein adjustment is provided to vary the tension of the leaf springs and to obtain a balanced structure.

A further object is to provide a strong and durable structure that is simple in construction and can be manufactured at a comparatively low cost.

Other objects, advantages and novel details of construction of this invention will be made more apparent as this description proceeds, especially when considered in connection with the accompanying drawings, wherein:

Figure 1 is a perspective view of a spring structure embodying my invention;

Figure 2 is a vertical sectional view through the structure illustrated in Figure 1;

Figure 3:
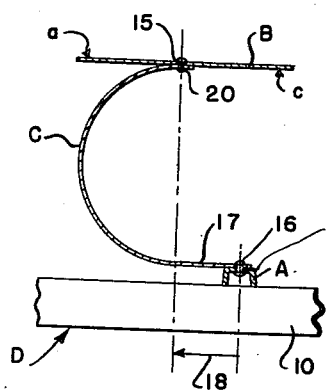
Figure 3 is an enlarged fragmentary vertical sectional view through the spring structure showing the upper point of attachment of the leaf spring offset to the left of the lower point of attachment thereof.

In the present instance, shorter leaf springs are employed and one point of attachment thereof, either with the supported or the supporting members of the structure, is preferably offset to one side or the other of the vertical or normal plane through the other point of attachment.

Referring now to the drawings, A are supporting members, B are the supported members, and C are the intermediate leaf springs of a structure embodying my invention. As shown, the structure is in the form of a bed spring, however it is to be understood that my invention is not limited or confined to a bed spring because the principle of my invention is applicable to any spring structure wherein leaf springs of substantially C-shape are used in combination with supporting and supported members.

In the present instance, the supporting members A are spaced apart a suitable distance in a common horizontal plane and are secured upon the rails 10 of a rigid frame D. The supported members B are in a common horizontal plane substantially parallel to the plane of the supporting members A and are preferably in the form of strips of spring metal arranged in pairs extending at substantially right angles to the supporting members A. Such members B may be connected at opposite ends thereof by suitable border strips 11 of spring metal and may be otherwise braced or reinforced intermediate their ends as at 12 and 13, respectively, if desired.

The leaf springs C are substantially C-shape in configuration and are preferably arranged in rows between the supporting and supported members A and B. Such springs C are substantially equal in width to, and are spaced apart longitudinally of, each pair of supported members B. Each spring C is made of spring metal and may comprise one or more leaves as desired.

Figure 4:
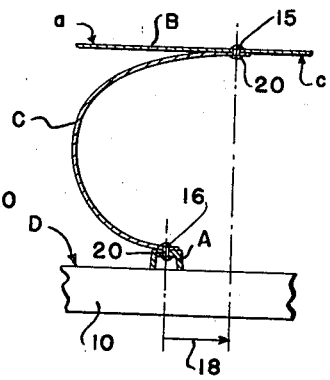
Figure 4 is a view similar to Figure 3 but showing the upper point of attachment offset to the right of the lower point of attachment.
Figure 5:
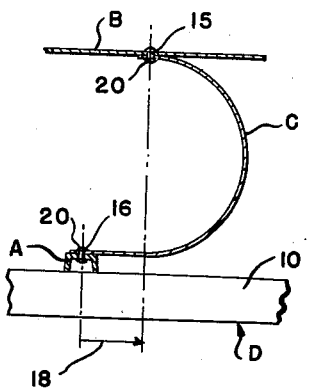
Figure 5 is a view similar to Figure 3 with the spring reversed and with the offset to the right of the lower point of attachment.
Figure 9:
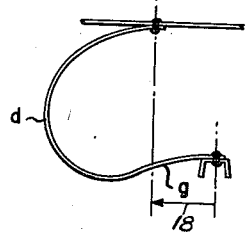
Figure 9 is a diagrammatic view of my improved spring structure when subjected to a compressive load.

In Figure 3 I have shown the upper point 15 of attachment of the leaf spring C with the supported members B offset a predetermined amount to the left of the lower points 16 of attachment thereof with the supporting members A, while in Figures 4 and 5 the upper point 15 of attachment of the leaf spring with the supported members B is offset a predetermined amount to the right of the lower point 16 of attachment thereof with the supporting member A. Preferably the lower part 17 of the leaf spring illustrated in Figure 3 corresponding approximately to the amount of the offset 18 is left flat so that such flat portion may flex downward, as illustrated in Figure 9, when the spring is under a compressive load. By leaving the part 17 flat or unformed, two advantages are obtained. First, the degree of flexure, and hence the stresses in the material, are lessened, thereby prolonging the life of the leaf. As a result of tests it has been found that the life of the leaf can be more than doubled by leaving the proper length flat. Second, the necessity of heat-treating the leaf to "set" the formed shape, is reduced or eliminated. This is due to the fact that in a spring shaped as described, loading has no tendency to straighten out or reverse the original form at any point. By properly proportioning this offset 18, the greatest possible degree of flexibility can be obtained from any given size of leaf spring. Moreover, the offset 18 permits shortening of the spring by approximately the amount of the offset without affecting the loaded height or dimension.

When the offset 18 is to the left, as illustrated in Figure 3, the assembly is softened, whereas when the offset 18 is to the right, as illustrated in Figure 4, the assembly is stiffened. In either case, the effect varies with the degree of offset. For example, the spring structure is softer when the offset is greater and would be stiffer when the amount of offset is less. The effect is greatest on the side toward *a* and least toward *c*. When the assembly contains a number of leaf springs of the type shown, the offset principle can provide almost complete control of elasticity throughout the supported surface.

Figure 8:
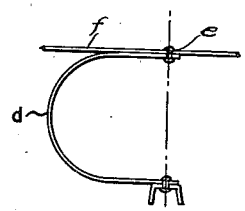
Figure 8 is a diagrammatic view of a conventional spring structure when subjected to a compressive load.

When a conventional leaf spring of C-shape is subjected to a compressive load, as illustrated in Figure 8, the greatest stress is at *d*. However, in my construction, other conditions remaining constant, the offset 18 tends to relieve the fibre stress at *d* and to increase it at *g*. The lowest maximum stress occurs when that at *d* and *g* are equal. When this occurs, durability of the leaf spring is greatest.

Figure 6:
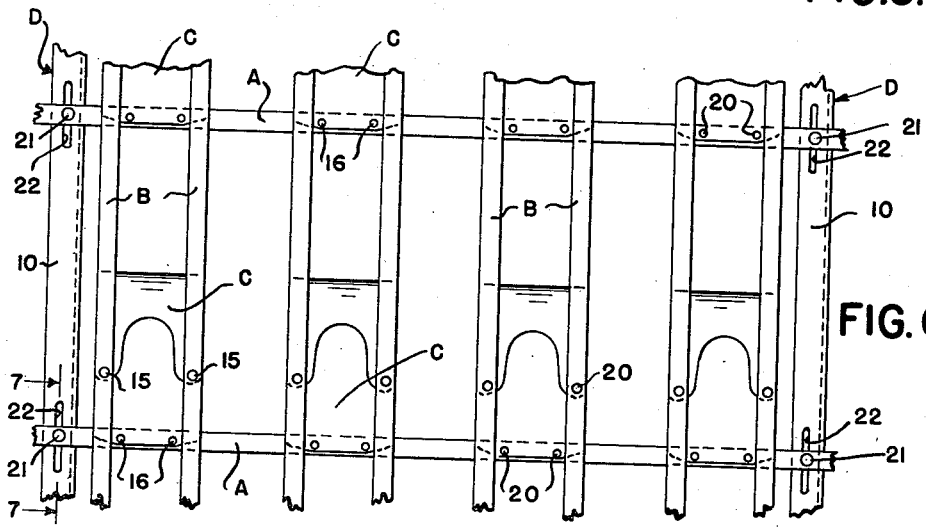
Figure 6 is a fragmentary top plan view of the spring structure.
Figure 7:
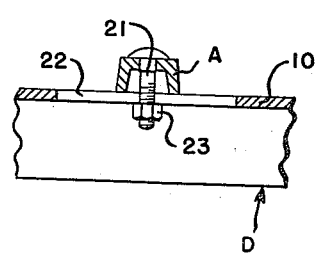
Figure 7 is a section taken substantially on the plane indicated by the line 7—7 of Figure 6.

In the present instance, the leaf springs C are secured by rivets 20 to the supported and supporting members, and the latter preferably, although not necessarily, have an adjustable connection with the rails 10 of the frame D. As illustrated in Figures 6 and 7, the supporting members A carry bolts 21 that engage suitable slots 22 in the rails 10 and are engaged beneath the latter by suitable clamping nuts 23. Thus, by adjusting the bolts 21 in the slots 22, the amount of offset 18 may be increased or decreased as desired to vary the effect of the controlling tension and to obtain a balanced spring structure.

What I claim as my invention is:

1. A spring structure having upper and lower substantially horizontal members, and upright substantially C-shaped springs between and fastened to the opposed horizontal faces of said members intermediate the ends thereof, the points of attachment between the lower ends of the springs and the lower horizontal member being offset laterally to one side of the vertical or normal plane through the points of attachment between the upper ends of the springs and the upper horizontal member, a supporting frame for the spring structure, and bolt and slot connections between the lower horizontal member and supporting frame adjustable to vary the amount of offset aforesaid.

2. A spring structure having upper and lower substantially horizontal members, and upright substantially C-shaped leaf springs between said horizontal members, the lower ends of said springs being riveted to the upper face of the lower horizontal member intermediate the ends thereof, the upper ends of said springs being riveted to the lower face of the upper horizontal member at points offset laterally to one side of the riveted connections aforesaid between the springs and lower horizontal member, a support beneath the lower horizontal member, and a bolt and slot connection between the lower horizontal member and support adjustable to vary the amount of offset aforesaid.

3. A spring structure having upper and lower substantially horizontal members, and upright substantially C-shaped springs between and fastened to the opposed horizontal faces of said members intermediate the ends thereof, the points of attachment between the lower ends of the springs and the lower horizontal member being offset laterally to one side of the vertical or normal plane through the points of attachment between the upper ends of the springs and the upper horizontal member, a supporting frame for the spring structure, and means connected to the lower horizontal member and supporting frame adjustable to vary the amount of offset aforesaid.

4. A spring structure having upper and lower substantially horizontal members, and upright substantially C-shaped leaf springs between said horizontal members, the lower ends of said springs being riveted to the upper face of the lower horizontal member intermediate the ends thereof, the upper ends of said springs being riveted to the lower face of the upper horizontal member at points offset laterally to one side of the riveted connections aforesaid between the springs and lower horizontal member, a support beneath the lower horizontal member, and a slidable connection between the lower horizontal member and support adjustable to vary the amount of offset aforesaid.

EVERETT S. TALLMADGE.